United States Patent [19]
Ikebe et al.

[11] Patent Number: 5,200,602
[45] Date of Patent: Apr. 6, 1993

[54] DISTANCE MEASURING DEVICE OF CAMERA

[75] Inventors: Keiichi Ikebe, Yokohama; Takashi Hongoh; Motokuni Demura, both of Kawasaki, all of Japan

[73] Assignee: Ricoh Company, Ltd., Tokyo, Japan

[21] Appl. No.: 886,841

[22] Filed: May 22, 1992

[30] Foreign Application Priority Data

Jul. 13, 1991 [JP] Japan .................. 3-198836

[51] Int. Cl.$^5$ .............................................. G01J 1/20
[52] U.S. Cl. ................................. 250/201.6; 354/403
[58] Field of Search ............... 250/201.6, 201.7, 561; 354/403; 356/1, 4, 152

[56] References Cited

U.S. PATENT DOCUMENTS

| 4,527,892 | 7/1985 | Yamane et al. |
| 4,601,574 | 7/1986 | Yamane et al. |
| 5,128,529 | 7/1992 | Nagaoka et al. ............ 250/201.6 |

Primary Examiner—David C. Nelms
Assistant Examiner—K. Shami
Attorney, Agent, or Firm—Oblon, Spivak, McClelland, Maier & Neustadt

[57] ABSTRACT

Pulse light is emitted by controlling the operation of a driving circuit by a microcomputer and is irradiated to a photographed object. Light reflected on the photographed object is received by a semiconductor optical position detector. First and second current outputs having a current ratio are inputted to first and second detecting circuits within an AF signal processing circuit in accordance with a light receiving position corresponding to a distance of the object. The first and second detecting circuits logarithmically transform changing amounts of the first and second current outputs. A differential detecting circuit calculates a difference between changing amounts of outputs of the first and second detecting circuits, and outputs a distance measuring signal to the microcomputer. A light receiving element measures the intensity of external light and an error in the distance measuring signal caused by the external light is corrected by the microcomputer on the basis of the above results.

6 Claims, 9 Drawing Sheets

DISTANCE MEASURING DEVICE OF CAMERA

BACKGROUND OF THE INVENTION

1. Field of the Invention

The present invention relates to a distance measuring device of a camera for accurately performing a distance measuring operation by correcting an error in distance measurement in accordance with the intensity of external light in a distance measuring system of a light emitting type.

2. Description of the Related Art

There is a double image conforming system in a passive system using external light as a distance measuring system of an automatic focusing adjustment in a so-called compact camera, etc.

A movable mirror for changing a relative position of one image with respect to another image is indispensable to this double image conforming system in the passive system. Accordingly, durability of the camera is reduced by using this movable mirror. Further, a distance measuring operation is performed by the contrast information of a photographed object to be measured since the double image conforming system is used. Accordingly, the distance measuring operation greatly depends on the photographed object. Therefore, distance measuring ability is reduced when the photographed object has a weak contrast and it is dark. Further, such a double image conforming system having a movable section has disadvantages that it is complicated to adjust an operation of the double image conforming system and it takes much time and labor to adjust this operation.

No distance measuring operation greatly depends on the photographed object in the case of a trigonometrical survey system using an active system for emitting light, etc. from a distance measuring device. However, there are also problems about the reduction of durability of the camera and the complicated adjustment mentioned above when this trigonometrical survey system has a movable section for rotating a light emitting portion or a light receiving portion of infrared rays. etc.

There is a supersonic wave system as one kind of the active system. In this supersonic wave system, a supersonic wave is emitted from a supersonic wave emitting portion to a measured object and is reflected on the measured object. A distance between the supersonic wave emitting portion and the measured object is measured from a time required from the emission of the supersonic wave to the reception thereof. In this supersonic wave system, a distance measuring operation is easily performed since the above distance is measured by only electric processing. However, it is necessary to emit the supersonic wave with high power so that a large-sized power source is required. For example, it is difficult to emit an effective supersonic wave by using a power source used in a compact camera, etc.

It is necessary to improve directivity of the supersonic wave so as to prevent an accuracy in distance measurement from being reduced by emitting the supersonic wave to an object except for the measured object. Therefore, it is necessary to increase an are for each of faces for emitting and receiving the supersonic wave. Such requirements cause a big problem of the compact camera, etc.

In a distance detector described next, no high power is required and it is easy to adjust an operation of the camera. Further, it is possible to provide a preferable durability of the camera and a high distance resolution.

This distance detector has a light source for emitting pulse light to a measured object and a semiconductor optical position detector called a PSD in the following description. The semiconductor optical position detector is disposed in a position for focusing and forming a spot of the pulse light reflected on the measured object as an image. The position of an incident spot according to a distance of the measured object based on a parallax between the light source and the semiconductor optical position detector is continuously detected by the semiconductor optical position detector in a position-changing direction in which this distance is changed. Thus, the semiconductor optical position detector provides first and second electric current outputs having a mutual electric current ratio according to the detected position of the incident spot.

The distance detector also has a first detecting circuit for receiving the first electric current output of the semiconductor optical position detector and logarithmically transforming and outputting a changing amount of the first electric current output provided by the pulse light. The distance detector also has a second detecting circuit for receiving the second electric current output of the semiconductor optical position detector and logarithmically transforming and outputting a changing amount of the second electric current output provided by the pulse light. The distance detector further has a differential detecting circuit for providing a distance detecting signal by calculating a difference between the changing amounts of the first and second electric current outputs logarithmically transformed and outputted by the first and second detecting circuits.

In this distance detector, there is no problem about a distance measurement in a dark place. However, at the time of a general photographing operation, etc., there is stationary light having a quantity much larger than that of th pulse light from a pulse light emitting device so that no reflected light can be extracted from the pulse light.

Therefore, in this case, an influence of the stationary light is removed from the pulse light by the first detecting circuit and the second detecting circuit for respectively receiving the first and second electric current outputs of the PSD. Changing amounts of photoelectric currents provided by only the reflected light of the pulse light are respectively transformed logarithmically and outputted from the first and second detecting circuits. The differential detecting circuit calculates a difference between these changing amounts and outputs a distance detecting signal corresponding to an electric current ratio of the first and second electric current outputs of the PSD.

However, such a distance detector has a problem about an operation thereof when a quantity of the stationary light is increased.

Therefore, the inventors of the present application proposed a distance detector having the following structure for solving such a problem in Japanese Patent Application Laying Open (KOKAI) No. 57-192815.

This distance detector has first and second detecting circuits for logarithmically transforming only a changing amount of the output of a semiconductor optical position detector (PSD) provided by pulse light. The distance detector also has a first transistor for logarithmic compression having a collector for receiving an input current signal of each of the first and second detecting circuits. The distance detector also has a first operational amplifier having an inverted input terminal connected to the collector of the first transistor and an output terminal connected to an emitter of the first transistor. The distance detector also has a second transistor having an emitter connected to the output terminal of the first operational amplifier. The distance detector also has a second operational amplifier having an inverted input terminal connected to a collector of the second transistor.

The distance detector also has an electric current supplying circuit for setting an output voltage of the second operational amplifier to a control voltage and supplying an electric current to the collector of the second transistor in accordance with this control voltage. The distance detector also has a capacitor for holding the control voltage in this electric current supplying circuit. The distance detector also has a diode or a third transistor. The diode or the third transistor supplies an electric current corresponding to a changing amount of the above input electric current signal from an output of the second operational amplifier to the collector of the second transistor only at a receiving time of the pulse light emitted from a light source. A voltage drop corresponding to a logarithmic value of this corresponding electric current is caused in the diode or the third transistor. In the distance detector, a detecting output is provided from an output terminal of the second operational amplifier. Such a structure of the distance detector is provided to remove the above problems about transistor characteristics and stabilize an operation of the distance detector.

In such a distance detector, two analog switches are disposed to switch electric circuits in accordance with a stationary state and a pulse light emitting state. A detecting signal with respect to the pulse light is extracted by this switching operation. Therefore, it is not easy to operate the analog switches at a suitable timing. In particular, when the above structure is replaced with integrated circuits (IC), it is difficult to operate the two analog switches at a suitable timing. Further, oscillation tends to be caused so that no distance detector is stably operated. Therefore, no electric circuits of the distance detector can be stably operated so that it is difficult to construct the distance detector by integrated circuits.

In consideration of such a situation, the same applicant as this patent application filed an application about a distance detector with the Japanese Patent Office. This application is already published as Japanese Patent Publication (KOKOKU) No. 2-24325. In this distance detector, the unstable elements of electric circuits are removed by using a relatively simple circuit structure. Accordingly, the distance detector can be stably operated sufficiently when the distance detector is constructed by integrated circuits.

This distance detector has first and second detecting circuits for logarithmically transforming only a changing amount of the output of a semiconductor optical position detector (PSD) provided by pulse light. The distance detector also has a first transistor having an emitter for receiving an input current signal of each of the first and second detecting circuits. The distance detector also has a first operational amplifier having an inverted input terminal connected to the emitter of the first transistor and an output terminal connected to a base of the first transistor. The distance detector also has a second transistor having a collector or a drain connected to a collector of the first transistor. The distance detector also has a second operational amplifier having an non-inverted input terminal connected to the collector or the drain of the second transistor and an output terminal connected to a base or a gate of the second transistor. The second operational amplifier has an inverted input terminal having a predetermined voltage.

The distance detector also has a third transistor having a base connected to the collector or the drain of the second transistor. The distance detector also has a capacitor connected between the base (or the gate) and an emitter (or a source) of the second transistor and having a sufficient capacity. The distance detector further has an electric current detecting circuit for detecting a collector current of the third transistor and providing this collector current to a differential detecting circuit. In this distance detector, only a signal component with respect to the pulse light is extracted without switching analog switches.

However, in this distance detector described in the Japanese patent publication, it is difficult to prevent an error in distance measurement from being caused by external light. Reflected light of signal light emitted from a light emitting element has a constant intensity at the same distance of the photographed object. In contrast to this, an intensity of the external light is greatly changed in accordance with brightness of light around the distance detector. When the intensity of the external light is large, an S/N ratio in a light receiving circuit is reduced so that distance measuring results are changed. Namely, it is difficult to accurately measure the distance between the photographed object and the camera.

SUMMARY OF THE INVENTION

It is therefore a first object of the present invention to provide a distance measuring device of a camera for accurately measuring a distance between the camera and a photographed object without any influence of the intensity of external light.

A second object of the present invention is to provide a distance measuring device of a camera for rapidly and accurately correcting an error in distance measurement caused by external light.

A third object of the present invention is to provide a distance measuring device of a camera for measuring the intensity of external light by using a photometric device of the camera to provide a simplified structure of the camera and reduce cost thereof.

A fourth object of the present invention is to provide a distance measuring device of a camera for correcting an error in distance measurement caused by external light every camera to take the distance measurement with high accuracy.

In accordance with a first structure of the present invention, the above objects can be achieved by a distance measuring device of a camera comprising a light source for emitting pulse light to a measured object; a semiconductor optical position detector disposed in a position in which a spot of the pulse light reflected on the measured object is focused and formed as an image; the semiconductor optical position detector continuously detecting the position of an incident light spot according to a distance of the measured object based on a parallax between the light source and the semiconductor optical position detector in a displacing direction of the spot position provided by a change in the distance; the semiconductor optical position detector providing first and second electric current outputs having a mutual electric current ratio according to the detected position of the incident light spot; a first detecting circuit for receiving the first electric current output of the semiconductor optical position detector, and logarithmically transforming and outputting a changing amount of the first electric current output provided by the pulse light; a second detecting circuit for receiving the second electric current output of the semiconductor optical position detector, and logarithmically transforming and outputting a changing amount of the second electric current output provided by the pulse light; a differential detecting circuit for providing a distance measuring signal by calculating a difference between the changing amounts of the first and second electric current outputs logarithmically transformed and outputted from the first and second detecting circuits; external light measuring means for measuring the luminance of a photographed object; and means for correcting an error in the distance measuring signal of the differential detecting circuit caused by external light by using an intensity of the external light measured in advance by the external light measuring means.

In accordance with a second structure of the present invention, the correcting means corrects the error in the distance measuring signal of the differential detecting circuit caused by the external light in accordance with the following formula.

$$V = Vx - \Delta Vn_1 \cdot Ix$$

In this formula, reference numerals V, Vx, Ix, and $\Delta Vn_1$ respectively designate an output indicative of corrected distance measuring results, an output indicative of uncorrected distance measuring results, an output of the external light measuring means, and a correction constant.

In accordance with a third structure of the present invention, the external light measuring means is constructed by a photometric device of the camera.

In accordance with a fourth structure of the present invention, the above objects can be achieved by a distance measuring device of a camera comprising a light source for emitting pulse light to a measured object; a semiconductor optical position detector disposed in a position in which a spot of the pulse light reflected on the measured object is focused and formed as an image; the semiconductor optical position detector continuously detecting the position of an incident light spot according to a distance of the measured object based on a parallax between the light source and the semiconductor optical position detector in a displacing direction of the spot position provided by a change in the distance; the semiconductor optical position detector providing first and second electric current outputs having a mutual electric current ratio according to the detected position of the incident light spot; a first detecting circuit for receiving the first electric current output of the semiconductor optical position detector, and logarithmically transforming and outputting a changing amount of the first electric current output provided by the pulse light; a second detecting circuit for receiving the second electric current output of the semiconductor optical position detector, and logarithmically transforming and outputting a changing amount of the second electric current output provided by the pulse light; a differential detecting circuit for providing a distance measuring signal by calculating a difference between the changing amounts of the first and second electric current outputs logarithmically transformed and outputted from the first and second detecting circuits; external light measuring means for measuring the luminance of a photographed object; a microcomputer disposed in the camera; an electrically erasable and writable memory element for writing a correction constant thereto with respect to external light every one camera by the microcomputer; and means for correcting an error in the distance measuring signal of the differential detecting circuit caused by the external light; the correcting means making a calculation for correcting this error by an intensity of the external light measured by the external light measuring means and the correction constant stored to the memory element such that a distance measurement is optimally taken every camera.

In the above distance measuring device of a camera having each of the first to fourth structures, when pulse light is emitted from the light source to an object to be measured with respect to distance, a spot of this light reflected on this measured object is focused and formed as an image in a position of the semiconductor optical position detector according to a distance of the measured object based on a parallax between the semiconductor optical position detector and the light source. The image forming position of the semiconductor optical position detector is changed in accordance with a change in distance of the measured object. Accordingly, the image forming position can be continuously detected in a changing direction thereof. First and second electric current outputs are outputted at a mutual electric current ratio from both ends of the semiconductor optical position detector.

The first electric current output is transmitted to the first detecting circuit. The first detecting circuit logarithmically transforms and outputs a changing amount of the first electric current output provided by the pulse light. The second electric current output is transmitted to the second detecting circuit. The second detecting circuit logarithmically transforms and outputs a changing amount of the second electric current output provided by the pulse light.

Outputs of the first and second detecting circuits are transmitted to the differential detecting circuit. The differential detecting circuit calculates a difference between the first and second electric current outputs and outputs a distance detecting signal. The correcting means corrects an error in the distance detecting signal caused by the external light based on measured results of the external light measuring means for measuring an intensity of the external light in advance.

The correcting means corrects the error in the distance detecting signal caused by the external light in accordance with the following formula.

$$V = Vx - \Delta Vn_1 \cdot Ix$$

Namely, external light measuring results of the external light measuring means multiplied by a correction constant are subtracted by the correcting means from uncorrected distance measuring results of an uncorrected distance detecting signal outputted from the differential detecting circuit.

It is not necessary to separately dispose the above external light measuring means by using a photometric device arranged in the camera in advance to measure the intensity of the external light.

To correct the error in the distance detecting signal caused by the external light, the correction constant is written by the microcomputer to the electrically erasable memory element in advance every one camera. Further, the external light measuring means measures a brightness of the external light. The error in the uncorrected distance detecting signal caused by the external light and outputted from the differential detecting circuit is corrected by the correcting means every camera from respective measured data of the external light measuring means and data of the correction constant stored to the memory element and corresponding to the respective measured data.

In the above structures of the distance measuring device of a camera, a distance between the camera and a photographed object can be accurately measured without any influence of the intensity of external light. Further, an error in distance measurement caused by the external light can be corrected rapidly and accurately. Further, an intensity of the external light can be measured by using a photometric device of the camera to provide a simplified structure of the camera and reduce cost thereof. Furthermore, the error in distance measurement caused by the external light can be corrected every camera to take the distance measurement with high accuracy.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a distance measuring device of a camera in the present invention will next be described in detail with reference to the accompanying drawings.

Figure 1:
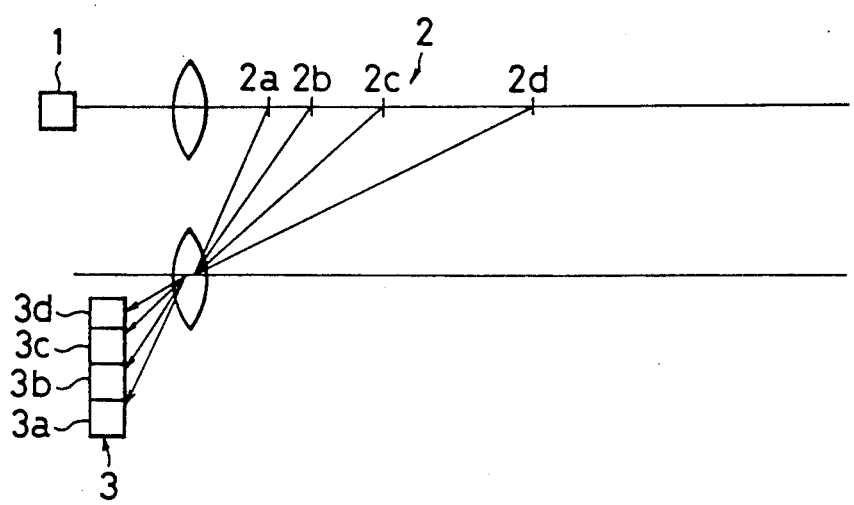
FIG. 1 is a view for explaining the distance measuring principle of a trigonometrical survey system using a general active system.

FIG. 1 shows a trigonometrical survey system using an active system in which no movable section is disposed. In this trigonometrical survey system, light such as infrared rays is emitted from a light emitting portion 1 and is reflected on an object 2 (2a, 2b, 2c, 2d, etc.) to be measured with respect to distance. A distance between the light emitting portion 1 and the measured object 2 is detected by arranging plural light receiving elements such as four elements 3a, 3b, 3c and 3d constituting a light receiving portion 3, and knowing any one of the light receiving elements receiving the reflected light.

This trigonometrical survey system has no movable section and almost has no problems about the durability of a camera, the adjustment of an operation of the camera, etc. However, this trigonometrical survey system has a serious problem that distance resolution is limited since the light receiving portion 3 is quantized.

For example, when the light receiving portion 3 is composed of the four light receiving elements 3a to 3d as shown in FIG. 1, only seven distance zones can be obtained even when intermediate positions of the respective light receiving elements 3a to 3d are included as the distance zones. Accordingly, distance resolution is considered to be reduced if an error in distance zone is considered.

There is a supersonic wave system as one kind of the active system. In this supersonic wave system, a supersonic wave is emitted from a supersonic wave emitting portion to a measured object and is reflected on the measured object. A distance between the supersonic wave emitting portion and the measured object is measured from a time required from the emission of the supersonic wave to the reception thereof. In this supersonic wave system, a distance measuring operation is easily performed since the above distance is measured by only electric processing. However, it is necessary to emit the supersonic wave with high power so that a large-sized power source is required. For example, it is difficult to emit an effective supersonic wave by using a power source used in a compact camera, etc.

It is necessary to improve directivity of the supersonic wave so as to prevent an accuracy in distance measurement from being reduced by emitting the supersonic wave to an object except for the measured object. Therefore, it is necessary to increase an area for each of faces for emitting and receiving the supersonic wave. Such requirements cause a big problem of the compact camera, etc.

In a distance detector described next, no high power is required and it is easy to adjust an operation of the camera. Further, it is possible to provide a preferable durability of the camera and a high distance resolution.

This distance detector has a light source for emitting pulse light to a measured object and a semiconductor optical position detector called a PSD in the following description. The semiconductor optical position detector is disposed in a position for focusing and forming a spot of the pulse light reflected on the measured object as an image. The position of an incident spot according to a distance of the measured object based on a parallax between the light source and the semiconductor optical position detector is continuously detected by the semiconductor optical position detector in a position-changing direction in which this distance is changed. Thus, the semiconductor optical position detector provides first and second electric current outputs having a mutual electric current ratio according to the detected position of the incident spot.

The distance detector also has a first detecting circuit for receiving the first electric current output of the semiconductor optical position detector and logarithmically transforming and outputting a changing amount of the first electric current output provided by the pulse light. The distance detector also has a second detecting circuit for receiving the second electric current output of the semiconductor optical position detector and logarithmically transforming and outputting a changing amount of the second electric current output provided by the pulse light. The distance detector further has a differential detecting circuit for providing a distance detecting signal by calculating a difference between the changing amounts of the first and second electric current outputs logarithmically transformed and outputted by the first and second detecting circuits.

One example of this distance detector will next be described in detail with reference to FIGS. 2 to 6.

Figure 2:
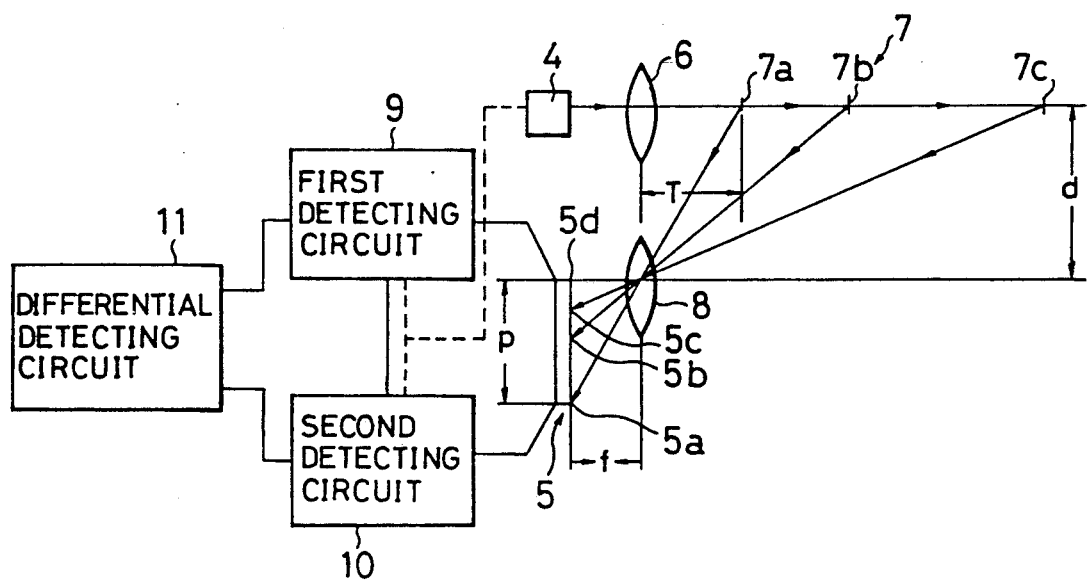
FIG. 2 is a view for explaining the construction of a general distance detector.

In FIG. 2, a pulse light emitting device 4 desirably generates infrared rays in consideration of invisibility and sensitivity of a semiconductor optical position detector (PSD) 5. Pulse light emitted from the pulse light emitting device 4 is projected to a photographed object 7 (7a, 7b, 7c, etc.) as a measured object through a light emitting lens 6.

The pulse light reflected on the photographed object 7 is incident to the semiconductor optical position detector (PSD) 5 through a light receiving lens 8 and is focused and formed as an image by this lens 8. This PSD 5 is constructed by a PIN photodiode of a planar type manufactured by using ion implantation and having a one-dimensional continuous position resolution. This PSD 5 is called position sensitive detectors.

The PSD of this kind is divided into one-dimensional and two-dimensional types. However, any one of the one-dimensional and two-dimensional types may be used since it is sufficient to detect a one-dimensional position of the light spot. As shown in FIG. 2, the reflected light spot is focused and formed as an image in each of positions 5a, 5b, 5c and 5d of the PSD 5 respectively corresponding to the positions 7a, 7b, 7c and infinity of the photographed object 7.

Figure 3:
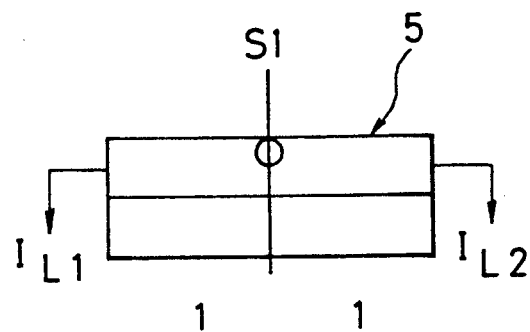
FIG. 3 is an explanatory view for showing the relation between a ratio of output electric currents and a reflected light spot focused and formed as an image in a central portion of a semiconductor optical position detector (PSD) in the distance detector shown in FIG. 2.
Figure 4:
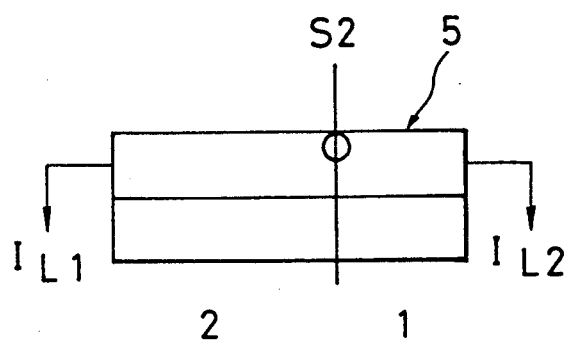
FIG. 4 is an explanatory view for showing the relation between the ratio of output electric currents and the reflected light spot focused and formed as an image on the side of a right-hand edge of the PSD from a position of the central portion thereof shown in FIG. 3.
Figure 5:
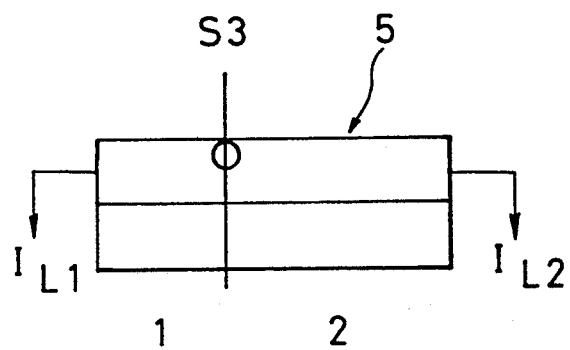
FIG. 5 is an explanatory view for showing the relation between the ratio of output electric currents and the reflected light spot focused and formed as an image on the side of a left-hand edge of the PSD from the position of the central portion thereof shown in FIG. 3.

This PSD 5 can know an incident position of the light spot from a divisional value of two electric current outputs. For example, when the light spot is incident onto a light receiving face of the PSD 5 in a central position S1 thereof as shown in FIG. 3, a ratio of two electric current outputs $I_{L1}$ and $I_{L2}$ is set to $I_{L1}/I_{L2}=1$. When the light spot is incident onto the light receiving face of the PSD 5 in a position S2 thereof as shown in FIG. 4, this ratio is set to $I_{L1}/I_{L2}=2$. When the light spot is incident onto the light receiving face of the PSD 5 in a position S3 thereof as shown in FIG. 5, this ratio is set to $I_{L1}/I_{L2}=\frac{1}{2}$.

In FIG. 2, reference numeral d designates a distance between the light emitting lens 6 and the light receiving lens 8, i.e., a base length. Reference numerals f and T respectively designate a distance from the light receiving lens 8 to the PSD 5 and a distance from the light emitting lens 6 to the photographed object 7. Further, reference numeral P designates a distance from the position 5d corresponding to infinity of the light spot on the PSD 5 to the position 5a.

In this case, the distance T is provided as follows.

$$T = \frac{f \cdot d}{P} \tag{1}$$

The position of the light spot focused and formed as an image on the PSD 5 corresponds to the ratio of the two electric current outputs obtained from the PSD 5. Accordingly, it is possible to obtain information of the distance T of the photographed object from these two electric current outputs.

When an entire length of the PSD 5 is set to a unit length, i.e., value 1, the relation between the distance T of the photographed object and the detected electric current ratio $I_{L1}/I_{L2}$ of the PSD 5 is provided as follows.

$$T \cdot \frac{I_{L1}}{I_{L1} + I_{L2}} = f \cdot d \tag{2}$$

Thus, the distance T is provided as follows.

$$T = \frac{I_{L1} + I_{L2}}{I_{L1}} f \cdot d = \left(1 + \frac{1}{\frac{I_{L1}}{I_{L2}}}\right) f \cdot d \tag{3}$$

$$= \left(1 + \frac{1}{x}\right) f \cdot d \quad [x = I_{L1}/I_{L2}]$$

Figure 6:
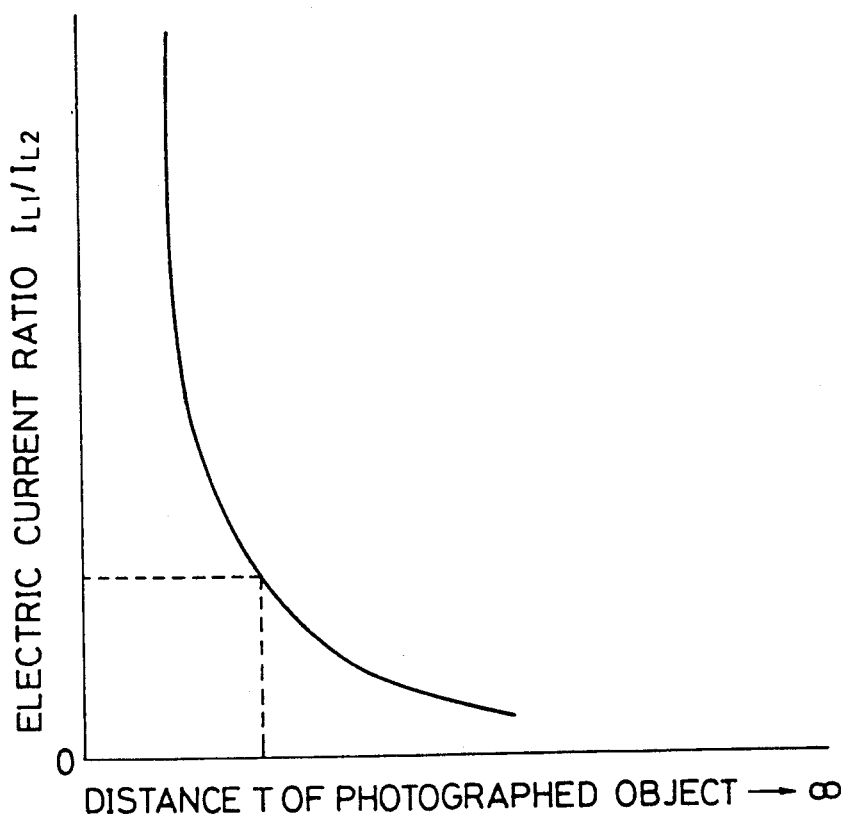
FIG. 6 is a graph of a characteristic curve showing a ratio of electric current outputs of the PSD with respect to the distance of a photographed object in the distance detector shown in FIG. 2.

Accordingly, the relation $y=(1/x)+K$ is formed as shown in FIG. 6.

There is no problem about a distance measurement in a dark place. However, at the time of a general photographing operation, etc., there is stationary light having a quantity much larger than that of the pulse light from the pulse light emitting device 4 so that no reflected light can be extracted from the pulse light.

Therefore, in this case, an influence of the stationary light is removed from the pulse light by the first detecting circuit 9 and the second detecting circuit 10 for respectively receiving the first and second electric current outputs of the PSD 5. Changing amounts of photoelectric currents provided by only the reflected light of the pulse light are respectively transformed logarithmically and outputted from the first and second detecting circuits 9 and 10. A differential detecting circuit 11 calculates a difference between these changing amounts and outputs a distance detecting signal corresponding to an electric current ratio of the first and second electric current outputs of the PSD 5.

Figure 7:
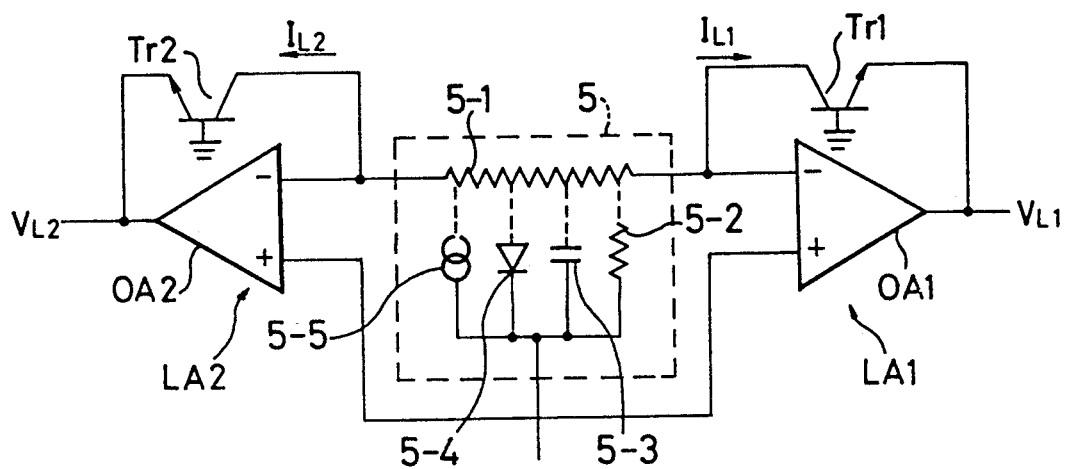
FIG. 7 is a circuit diagram showing constructions of the PSD and a detecting head section in each of first and second detecting circuits in the distance detector shown in FIG. 2.

FIG. 7 shows one example of the PSD 5 and a detecting head section of each of the first and second detecting circuits 9 and 10.

In FIG. 7, the PSD 5 is shown by an equivalent circuit. Reference numerals 5-1, 5-2, 5-3, 5-4 and 5-5 respectively designate a surface resistor, a parallel resistor, a junction capacitor, an ideal diode and an electric current source. Photoelectric current $I_{L1}$ generated from the PSD 5 is logarithmically transformed by a logarithmic transforming section LA1 composed of a logarithmic transforming transistor Tr1 and an operational amplifier OA1. Photoelectric current $I_{L2}$ generated from the PSD 5 is logarithmically transformed by a logarithmic transforming section LA2 composed of a logarithmic transforming transistor Tr2 and an operational amplifier OA2. Thus, the photoelectric currents $I_{L1}$ and $I_{L2}$ are respectively outputted as the following voltage outputs $V_{L1}$ and $V_{L2}$.

$$V_{L1} = -\frac{kT}{q} \cdot \ln \frac{I_{L1}}{Is} \tag{4}$$

$$V_{L2} = -\frac{kT}{q} \cdot \ln \frac{I_{L2}}{Is} \tag{5}$$

In these formulas (4) and (5), reference numerals k, T, q, and Is respectively designate a Boltzmann's constant, an absolute temperature, an electric charge, and an emitter saturation current of each of transistors Tr1 and Tr2.

The logarithmic transformation is performed to widen a dynamic range and easily calculate a ratio of the current outputs by calculating a difference between these voltage outputs.

Figure 8:
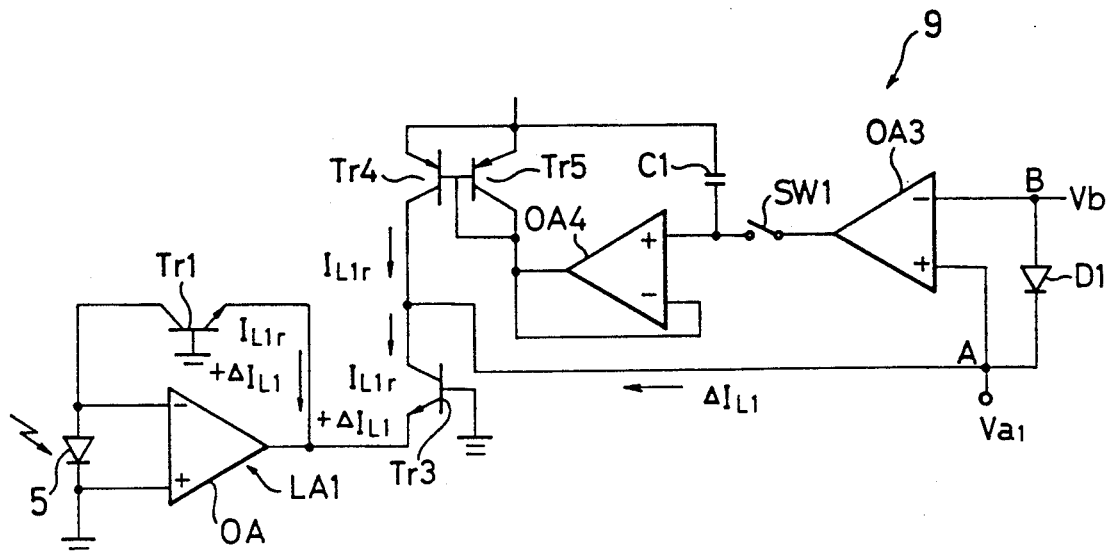
FIG. 8 is a circuit diagram showing the construction of an electric circuit for removing an influence of stationary light on a logarithmic transforming portion in the detecting head section shown in FIG. 7.

FIG. 8 shows one constructional example of each of the above detecting circuits 9 and 10 including an electric circuit for removing an influence of the stationary light from the logarithmic transforming outputs $V_{L1}$ and $V_{L2}$ obtained above.

The detecting circuit shown in FIG. 8 is disposed with respect to each of the first electric current output $I_{L1}$ and the second electric current output $I_{L2}$ of the PSD 5. Here, only the first detecting circuit 9 with respect to the first electric current output $I_{L1}$ is shown in FIG. 8. The second detecting circuit 10 with respect to the second electric current output $I_{L2}$ has a structure similar to that shown in FIG. 8.

In FIG. 8, a stationary photoelectric current $I_{L1r}$ flows through a transistor Tr1 in a stationary state. The same stationary photoelectric current flows through a transistor Tr3 from a transistor Tr4. At this time, a switch SW1 is closed and the feedback operation of an operational amplifier OA3 is performed through an operational amplifier OA4 and transistors Tr5 and Tr4 constituting a voltage follower. Accordingly, an electric potential at a point A in FIG. 8 is fixedly set to an electric potential at a point B having a voltage Vb.

Then, pulse light is generated from the pulse light emitting device 4 and the switch SW1 is simultaneously opened. At this time, a base electric potential of the transistor Tr4 is held by a capacitor C1 to be a value provided in the above stationary state. The stationary photoelectric current $I_{L1r}$ is still supplied to the transistor Tr3 from the transistor Tr4.

A changing amount $\Delta I_{L1}$ of the photoelectric current $I_{L1}$ provided by reflected light of the pulse light is supplied to the transistor Tr3 from the point B through a diode D1. Accordingly, an electric potential $Va_1$ at the point A is provided as follows.

$$Va_1 = Vb - \frac{kT}{q} \ln \frac{\Delta I_{L1}}{Is} \tag{6}$$

In this case, reference numeral Is designates a backward electric current of the diode D1.

Thus, it is possible to extract only the changing amount $\Delta I_{L1}$ of the photoelectric current $I_{L1}$. An electric potential $Va_2$ similar to the potential $Va_1$ and corresponding to a changing amount $\Delta I_{L2}$ of the photoelectric current $I_{L2}$ is calculated by the second detecting circuit 10 with respect to the second photoelectric current output $I_{L2}$ of the PSD 5. The differential detecting circuit 11 calculates a difference between these electric potentials $Va_1$ and $Va_2$ as follows.

$$Va_1 - Va_2 = \frac{kT}{q} \ln \frac{\Delta I_{L1}}{Is} - \frac{kT}{q} \ln \frac{\Delta I_{L2}}{Is} = \frac{kT}{q} \ln \frac{\Delta I_{L1}}{\Delta I_{L2}} \tag{7}$$

Thus, it is possible to calculate only a ratio of the photoelectric currents provided by the reflected light of the pulse light.

In accordance with such a structure, a distance measuring operation can be performed by detecting only the changing amounts of the photoelectric currents provided the pulse light.

Figure 9:
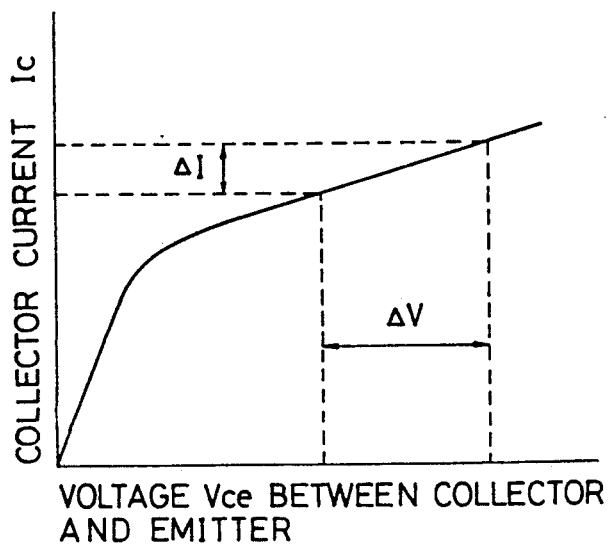
FIG. 9 is a graph of a characteristic curve showing the relation between a collector electric current and a voltage between a collector and an emitter of a transistor Tr4 in the electric circuit shown in FIG. 8.

The first detecting circuit 9 having the electric structure shown in FIG. 8 has no special problem in an ideal state. However, When a voltage Vce between a collector and an emitter of a PNP transistor used as the transistor Tr4 is changed by a value $\Delta V$ as shown in FIG. 9, a collector current Ic is also changed by a slight value $\Delta I$ in accordance with electric characteristics of the voltage Vce and the collector current Ic.

Accordingly, for example, if the electric potential Vb is set to zero volt in the stationary state and a collector voltage Vc of the PNP transistor Tr4 is reduced to $-2$ volts at an emitting time of the pulse light, a changing amount of the voltage Vce is equal to 2 volts so that a changing amount of the collector current Ic is considerably large. The changing amount of the collector current Ic is increased as a quantity of the stationary light is increased, thereby causing a serious problem.

Therefore, the inventors of the present application proposed a distance detector having the following structure for solving such a problem in Japanese Patent Application Laying Open (KOKAI) No. 57-192815.

This distance detector has first and second detecting circuits for logarithmically transforming only a changing amount of the output of a semiconductor optical position detector (PSD) provided by pulse light. The distance detector also has a first transistor for logarithmic compression having a collector for receiving an input current signal of each of the first and second detecting circuits. The distance detector also has a first operational amplifier having an inverted input terminal connected to the collector of the first transistor and an output terminal connected to an emitter of the first transistor. The distance detector also has a second transistor having an emitter connected to the output terminal of the first operational amplifier. The distance detector also has a second operational amplifier having an inverted input terminal connected to a collector of the second transistor.

The distance detector also has an electric current supplying circuit for setting an output voltage of the second operational amplifier to a control voltage and supplying an electric current to the collector of the second transistor in accordance with this control voltage. The distance detector also has a capacitor for holding the control voltage in this electric current supplying circuit. The distance detector also has a diode or a third transistor. The diode or the third transistor supplies an electric current corresponding to a changing amount of the above input electric current signal from an output of the second operational amplifier to the collector of the second transistor only at a receiving time of the pulse light emitted from a light source. A voltage drop corresponding to a logarithmic value of this corresponding electric current is caused in the diode or the third transistor. In the distance detector, a detecting output is provided from an output terminal of the second operational amplifier. Such a structure of the distance detector is provided to remove the above problems about transistor characteristics and stabilize an operation of the distance detector.

Figure 10:
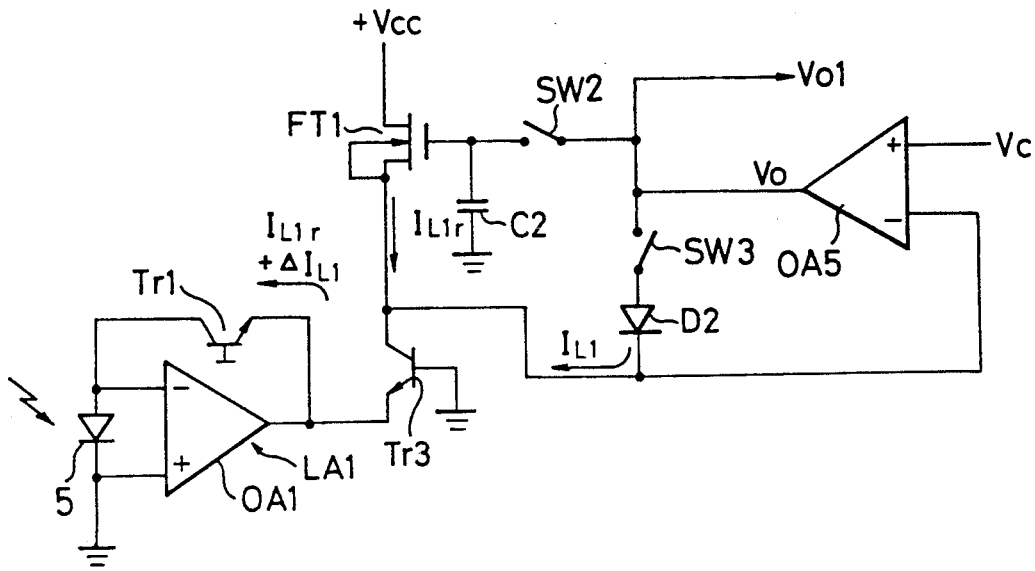
FIG. 10 is a circuit diagram showing first and second detecting circuits in another general distance detector.

FIG. 10 shows the constructions of first and second detecting circuits 9 and 10 constituting a main portion of such a distance detector as a concrete example. The first and second detecting circuits 9 and 10 completely have the same structure. Accordingly, only the construction of the first detecting circuit 9 is shown in FIG. 10.

As shown in FIG. 10, a logarithmic transforming section LA1 is composed of a logarithmic compressing transistor Tr1 and an operational amplifier OA1. A first electric current output $I_{L1}$ of a semiconductor optical position detector (PSD) 5 is logarithmically transformed through the logarithmic compressing transistor Tr1 disposed in the logarithmic transforming section LA1. Thus, an output voltage $V_{L1}$ shown in the above formula (4) is provided.

An electric current equal to the above electric current $I_{L1}$ flows through an N-channel MOS field effect transistor (N-MOS FET) FT1 from a power source +Vcc. This electric current is extended by a logarithmic extending transistor Tr3. At this time, it is possible to obtain an extending electric current ten times an original electric current if a base electric potential of a transistor Tr3 is set to be higher by about 60 mV than a base electric potential of the transistor Tr1. Further, it is possible to obtain an extending electric current twice the original electric current if an area for an emitter of the transistor Tr3 is set to be twice that of the transistor Tr1. The following description relates to one time extension in which no electric current is especially extended.

In a stationary state, a switch SW2 is closed and a switch SW3 is opened. A source electric potential of the N-MOSFET FT1 is fixedly set to an electric potential Vc of a non-inverted input terminal of an operational amplifier OA5 since an output of this operational amplifier OA5 is fed back.

Next, pulse light is emitted from the light source and the switch SW2 is simultaneously opened and the switch SW3 is closed. A gate electric potential of the N-MOSFET FT1 is fixedly set by charges stored to a capacitor C2 at an incident time of stationary light. Accordingly, a stationary photoelectric current $I_{L1r}$ is supplied to the transistor Tr3 by this MOSFET FT1. An electric current changing amount $\Delta I_{L1}$ provided by the pulse light is supplied from the operational amplifier OA5 through a diode D2.

Figure 11:
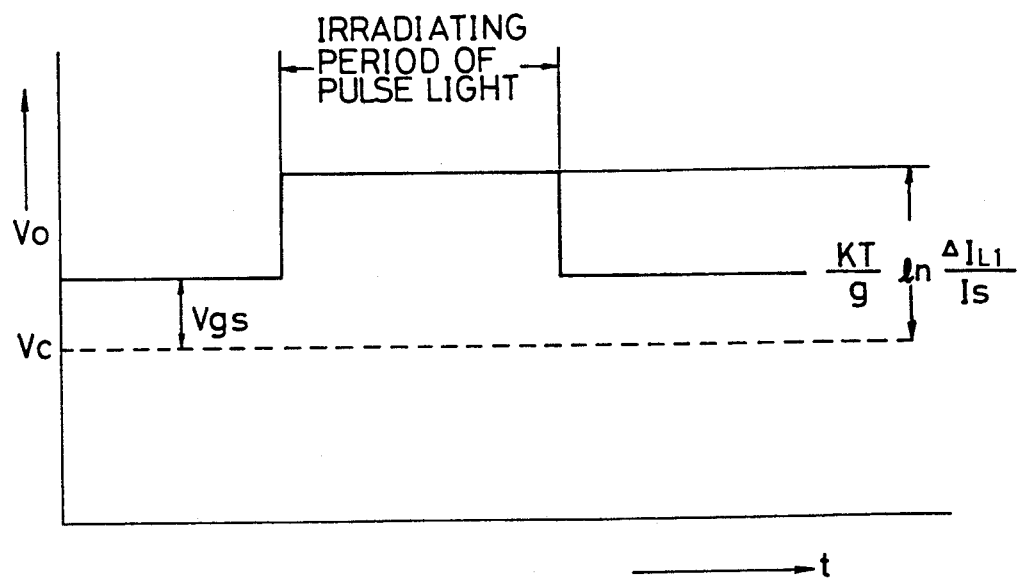
FIG. 11 is a view for explaining a changing state of the output of an operational amplifier OA5 in each of the detecting circuits shown in FIG. 10.

At this time, a feedback operation of the operational amplifier OA5 is performed through the diode D2 in a loop thereof. Accordingly, no voltage Vgs between a gate and a source of the MOSFET FT1 is changed. In this state, an output Vo provided from an output terminal of the operational amplifier OA5 is changed as shown in FIG. 11.

Namely, in a stationary state, a voltage $Vo_1$ from the output terminal of the operational amplifier OA5 is provided as follows.

$$Vo_1 = Vc + Vgs(Id = I_{LS}) \tag{8}$$

In emission and reception of the pulse light, this voltage $Vo_1$ is provided as follows.

$$Vo_1 = Vc + \frac{kT}{q} \ln(\Delta I_{L1}/Is) \tag{9}$$

In this formula (9), reference numeral Is designates a backward electric current of the diode D2.

The second detecting circuit 10 with respect to a second electric current output $I_{L2}$ of the PSD 5 has a structure completely similar to that of the first detecting circuit 9. An output of this second detecting circuit 10 is set to $Vo_2$.

Figure 12:
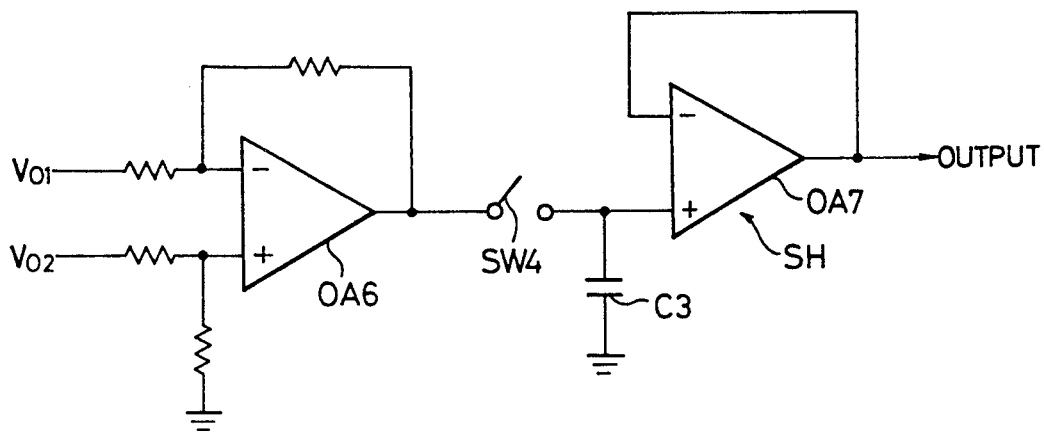
FIG. 12 is a diagram of a differential detecting circuit for detecting a difference in output between the first and second detecting circuits shown in FIG. 10.

The outputs $Vo_1$ and $Vo_2$ thus obtained are inputted to a differential detecting circuit constructed as shown in FIG. 12. In FIG. 12, output signals $Vo_1$ and $Vo_2$ are inputted to an operational amplifier OA6 constructed as a differential amplifier so that the following voltage signal $V_{Do}$ is obtained.

$$\begin{aligned}V_{Do} &= Vo_1 - Vo_2 \\ &= Vc + \frac{kT}{q} \ln \frac{\Delta I_{L1}}{Is} - \left(Vc + \frac{kT}{q} \ln \frac{\Delta I_{L2}}{Is}\right) \\ &= \frac{kT}{q} \ln (\Delta I_{L1}/\Delta I_{L2})\end{aligned} \tag{10}$$

Thus, an electric current ratio corresponding to a distance is obtained as the voltage value $V_{Do}$.

This voltage $V_{Do}$ is sampled and held during a light emitting period of the pulse light by a sample hold circuit section SH. For example, as shown in FIG. 12, the sample hold circuit section SH is composed of a sampling switch SW4, a holding capacitor C3 and an operational amplifier OA7 constituting a voltage follower as a buffer. For example, when a light emitting diode is used as a light emitting element, light emitting efficiency is greatly reduced by an increase in temperature of a junction portion of the light emitting diode. Accordingly, preferable sampling results of the voltage $V_{Do}$ are obtained if the voltage $V_{Do}$ is sampled immediately after the light emission. A system for sampling this voltage immediately after the light emission is also effective in a case in which a periodic component of a power source as a pulsating light component is superposed on that in a peripheral light source.

A sampled output has a voltage proportional to the distance. Accordingly, the sampled output may be used as a distance signal as it is. For example, the sampled output is used to adjust and control an automatic focusing operation and perform a displaying operation. Further, the sampled output may be used by converting this sampled output to divisional signals indicative of plural distance zones using a comparator, etc. every suitable voltage level. Thus, it is possible to effectively and stably remove an influence of the stationary light so that the distance measuring operation is performed with high accuracy.

As shown in FIG. 12, two analog switches SW2 and SW3 are disposed in such a structure to switch electric circuits in accordance with the stationary state and a pulse light emitting state. A detecting signal with respect to the pulse light is extracted by this switching operation. Therefore, it is not easy to operate the analog switches at a suitable timing. In particular, when the above structure is replaced with integrated circuits (IC), it is difficult to operate the two analog switches at a suitable timing. Further, oscillation tends to be caused so that no distance detector is stably operated. Therefore, no electric circuits of the distance detector can be stably operated so that it is difficult to construct the distance detector by integrated circuits.

In consideration of such a situation, the same applicant as this patent application filed an application about a distance detector with the Japanese Patent Office. This application is already published as Japanese Patent Publication (KOKOKU) No. 2-24325. In this distance detector, the unstable elements of electric circuits are removed by using a relatively simple circuit structure. Accordingly, the distance detector can be stably operated sufficiently when the distance detector is constructed by integrated circuits.

This distance detector has first and second detecting circuits for logarithmically transforming only a changing amount of the output of a semiconductor optical position detector (PSD) provided by pulse light. The distance detector also has a first transistor having an emitter for receiving an input current signal of each of the first and second detecting circuits. The distance detector also has a first operational amplifier having an inverted input terminal connected to the emitter of the first transistor and an output terminal connected to a base of the first transistor. The distance detector also has a second transistor having a collector or a drain connected to a collector of the first transistor. The distance detector also has a second operational amplifier having an non-inverted input terminal connected to the collector or the drain of the second transistor and an output terminal connected to a base or a gate of the second transistor. The second operational amplifier has an inverted input terminal having a predetermined voltage.

The distance detector also has a third transistor having a base connected to the collector or the drain of the second transistor. The distance detector also has a capacitor connected between the base (or the gate) and an emitter (or a source) of the second transistor and having a sufficient capacity. The distance detector further has an electric current detecting circuit for detecting a collector current of the third transistor and providing this collector current to a differential detecting circuit. In this distance detector, only a signal component with respect to the pulse light is extracted without switching analog switches.

Figure 13:
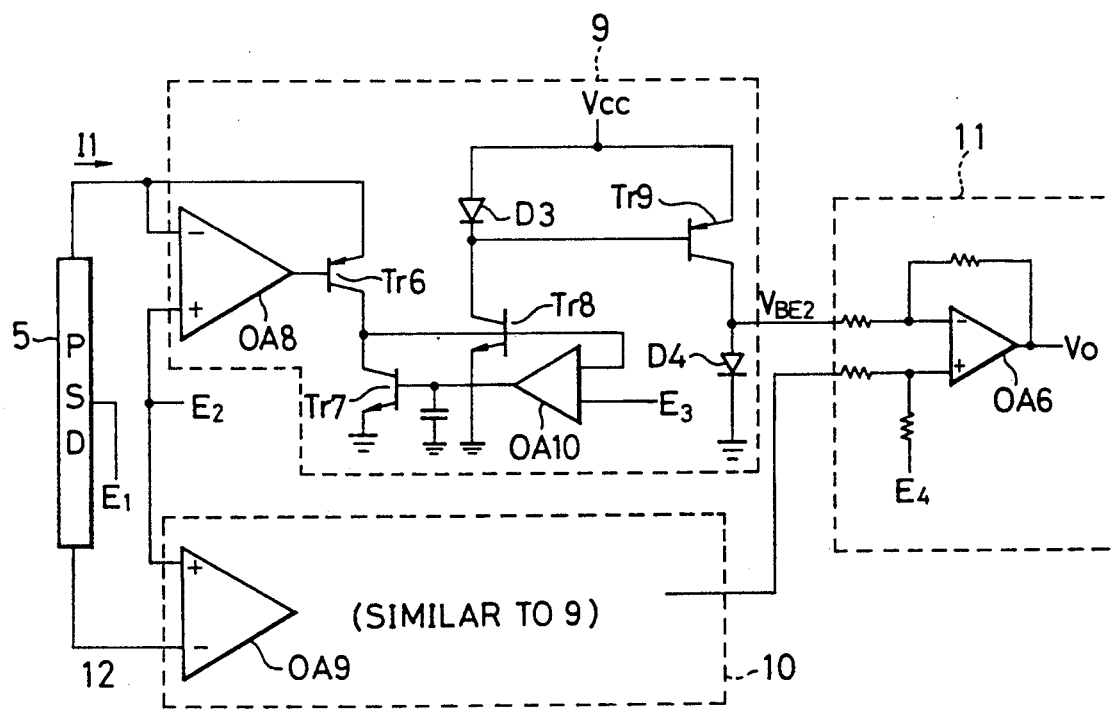
FIG. 13 is a diagram of a distance detecting circuit disposed in another general distance detector.

FIG. 13 schematically shows the construction of a basic electric circuit disposed in this distance detector. In FIG. 13, constructional portions similar to those in FIGS. 2 and 12 are designated by the same reference numerals. A second detecting circuit 10 is omitted since the second detecting circuit has a structure similar to that of a first detecting circuit 9.

Both output terminals of a semiconductor optical position detector (PSD) 5 are connected to operational amplifiers OA8 and OA9 of the first and second detecting circuits 9 and 10 since it is necessary to set electric potentials at these output terminals of the PSD 5 to be equal to each other. A first reference potential $E_1$ is provided at a reference potential terminal of the PSD 5.

An inverted input terminal of the operational amplifier OA8 is connected to an output terminal of the PSD 5. A second reference potential $E_2$ is provided at a non-inverted input terminal of the operational amplifier OA8. An output terminal of this operational amplifier OA8 is connected to a base of a transistor Tr6. The transistor Tr6 has an emitter connected to the inverted input terminal of the operational amplifier OA8. A collector of the transistor Tr6 is connected to a collector of a transistor Tr7. The transistor Tr7 has an emitter connected to the ground. A capacitor C3 is in parallel connected between a base and the emitter of the transistor Tr7 and has a sufficient capacity.

The collector of the transistor Tr7 is connected to a base of a transistor Tr8 having an emitter connected to the ground. The base of the transistor Tr8 is connected to a non-inverted input terminal of an operational amplifier OA10. An output terminal of this operational amplifier OA10 is connected to the base of the transistor Tr7.

A reference potential $E_3$ is provided at an inverted input terminal of the operational amplifier OA10. A collector of the transistor Tr8 is connected to a power source Vcc through a diode D3 having a polarity shown in FIG. 13 and is also connected to a base of a transistor Tr9. The transistor Tr9 has an emitter connected to the power source Vcc and a collector connected to the ground through a diode D4 having a polarity shown in FIG. 13. The transistors Tr8 and Tr9, etc. constitute a so-called current mirror circuit as a whole.

An output at a connection point between the transistor Tr9 and the diode D4 is transmitted to an inverted input terminal of an operational amplifier OA6 disposed in a differential detecting circuit 11. An output at a connection point of the second detecting circuit 10 similar to the above connection point of the first detecting circuit 9 is transmitted to a non-inverted input terminal of the operational amplifier OA6. A reference potential $E_4$ is provided at this non-inverted input terminal of the operational amplifier OA6.

An operation of this distance detector will next be described.

A photoelectric current outputted from the PSD 5 flows through the transistor Tr7 from the transistor Tr6. At this time, a base potential of the transistor Tr7 is set to a voltage $V_{BE1}$ between the emitter and the base of this transistor Tr7 and is represented as follows with respect to the photoelectric current $I_L$.

$$V_{BE1} = \frac{kT}{q} \ln \frac{I_L}{I_s} \quad (11)$$

In this formula (11), reference numeral Is designates an emitter saturation current of the transistor Tr7.

At this time, an electric potential between the base and the emitter of the transistor Tr8 is fixedly set to the reference potential E3 through the operational amplifier OA10. An electric current represented by the following formula (12) flows between the collector and the emitter of this transistor Tr8.

$$I_{bias} = I_s \exp\left(V_{BE2} \frac{kT}{q}\right) \quad (12)$$

In this formula (12), reference numerals Is and $V_{BE2}$ respectively designate an emitter saturation current of the transistor Tr8 and a voltage between the base and the emitter of the transistor Tr8. This electric current $I_{bias}$ flows through the current mirror circuit to the diode D4. Accordingly, an electric potential $V_{BE2}$ is provided at the connection point between the diode D4 and the transistor Tr9. The second detecting circuit 10 has a structure similar to that of the first detecting circuit 9. Accordingly, an output $V_o$ of the operational amplifier OA6 in the differential detecting circuit 11 has the reference potential E4 in a stationary state.

When a photoelectric current $\Delta I_{L1}$ provided by the pulse light flows through the transistor Tr6, this photoelectric current flows through the base of the transistor Tr8 since a base potential of the transistor Tr7 is held by the capacitor C3. If a current amplifying ratio of the transistor Tr8 is set to $h_{FE}$, an electric current of $h_{FE} \Delta I_{L1}$ flows through the collector of the transistor Tr8 so that this electric current $h_{FE} \Delta I_{L1}$ flows through the diode D4. Accordingly, an electric potential $V_{BE2}$ corresponding to the electric current $h_{FE} \Delta I_{L1}$ is provided at the connection point between the diode D4 and the transistor Tr9.

Figure 14:
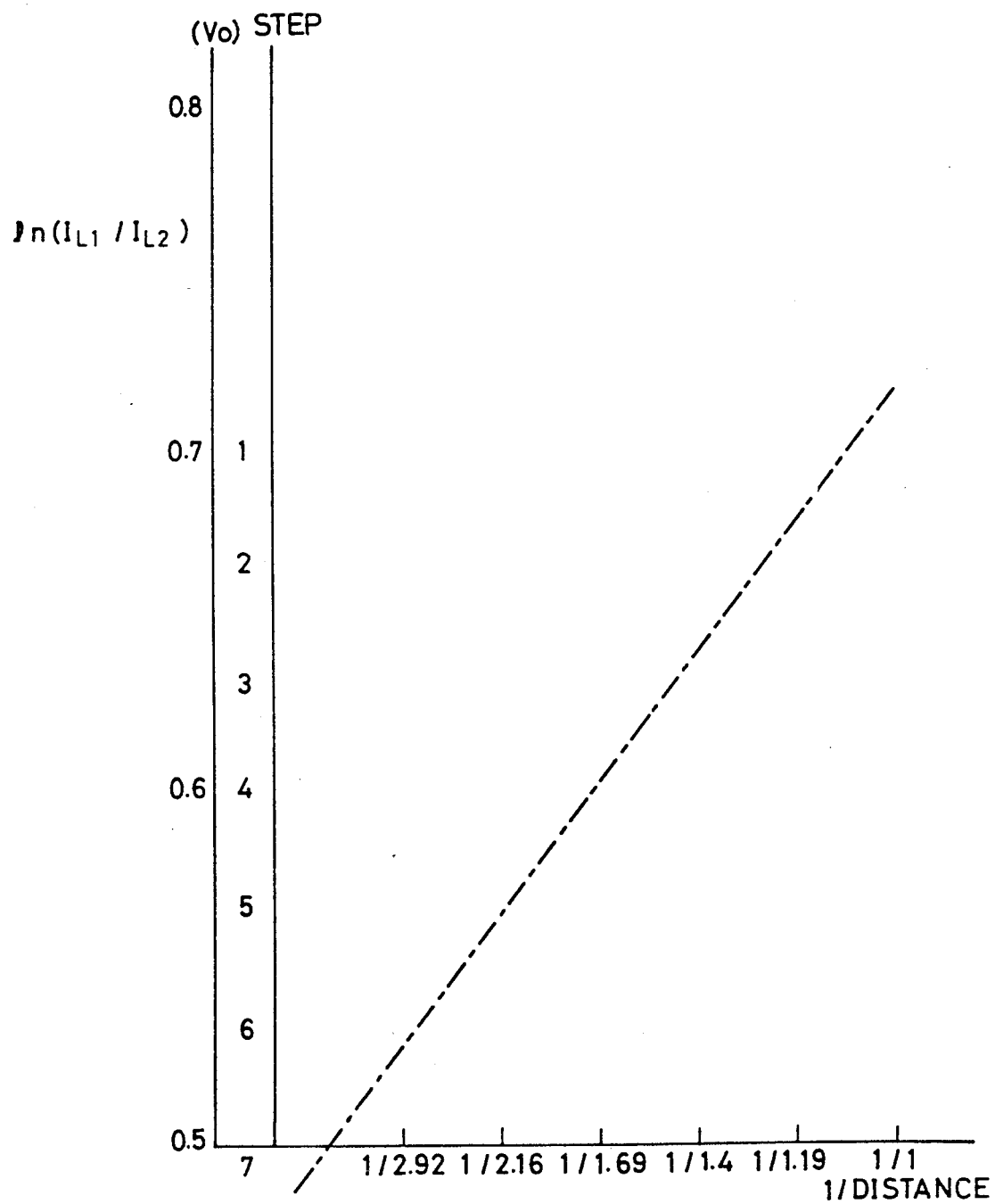
FIG. 14 is a graph showing the relation between the logarithm of a ratio of photoelectric currents and an inverse number of a distance (between a photographed object and a camera) provided by a semiconductor optical position detector (PSD) in the distance detecting circuit shown in FIG. 13.

As already described, ratios of photoelectric currents provided from both the output terminals of the PSD 5 are different from each other in accordance with incident positions of the light spot. In FIG. 14, the logarithm of a ratio $I_{L1}/I_{L2}$ of the photoelectric currents is shown on an axis of ordinate and the inverse number of a distance (between a camera and a photographed object) is shown on an axis of abscissa.

An output Vo of the operational amplifier OA6 is represented by the following formula (13) at an incident time of the pulse light.

$$V_o = \frac{kT}{q} \ln \frac{h_{FE} \cdot \Delta I_{L2}}{I_s} - \frac{kT}{q} \ln \frac{h_{FE} \cdot \Delta I_{L1}}{I_s} + E_4$$
$$= \frac{kT}{q} \ln \frac{h_{FE} \cdot \Delta I_{L2}}{h_{FE} \cdot \Delta I_{L1}} + E_4 \quad (13)$$

This formula (13) shows a shape similar to the shape of a slanting line shown in FIG. 14. Accordingly, the output Vo is apparently changed in accordance with the distance so that the distance can be judged by using this output Vo.

Accordingly, a circuit structure of the distance detector is simplified and no unstable factors are almost included in this circuit structure. Further, no analog switches are used in this circuit structure. Accordingly, the distance detector is very stably operated and there are no unstable elements in the distance detector when the distance detector are constructed by integrated circuits.

However, in this distance detector described in the Japanese patent publication, it is difficult to prevent an error in distance measurement from being caused by external light. Reflected light of signal light emitted from a light emitting element has a constant intensity at the same distance of the photographed object. In contrast to this, an intensity of the external light is greatly changed in accordance with brightness of light around the distance detector. When the intensity of the external light is large, an S/N ratio in a light receiving circuit is reduced so that distance measuring results are changed. Namely, it is difficult to accurately measure the distance between the photographed object and the camera.

Figure 15:
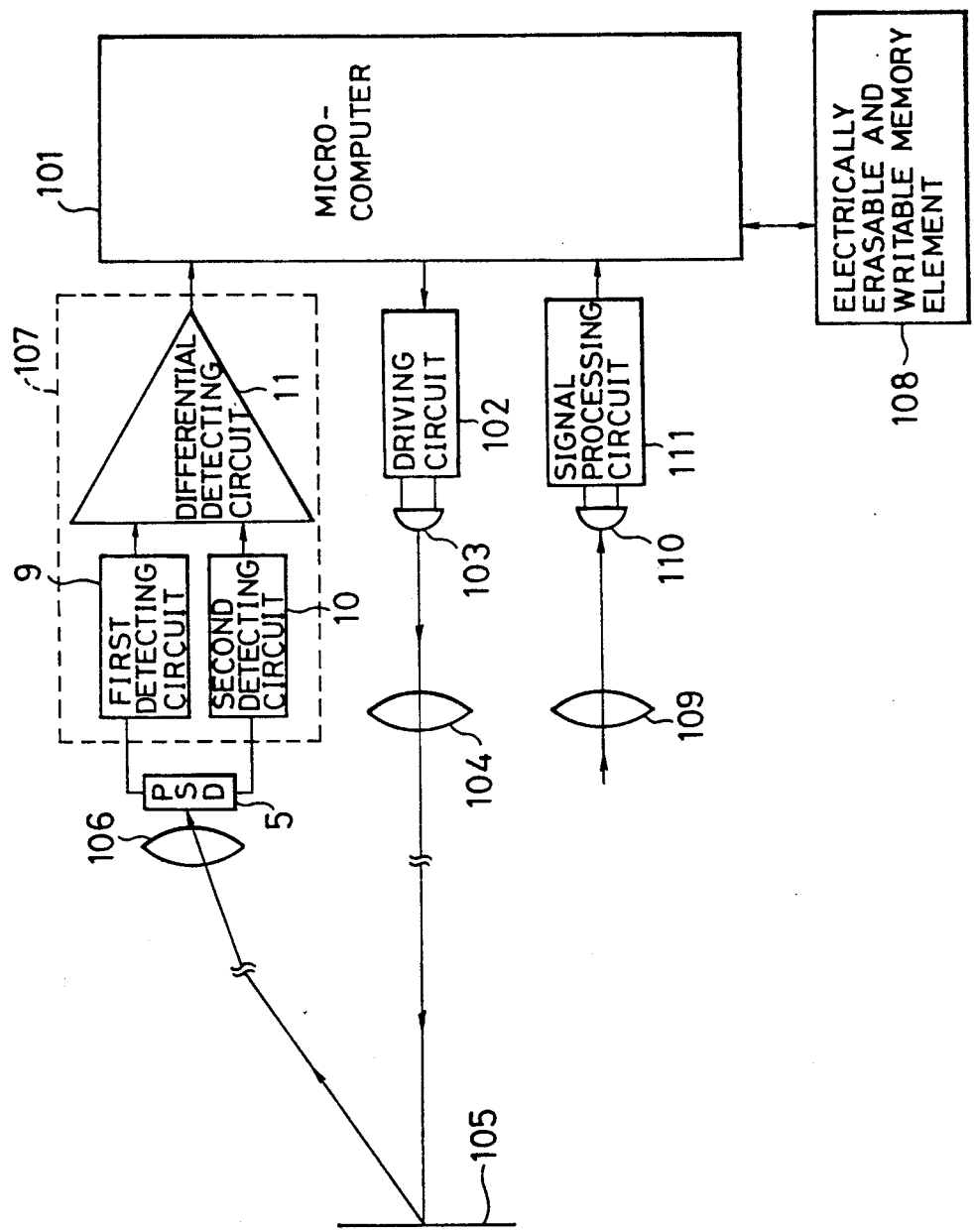
FIG. 15 is a block diagram showing the entire construction of a distance measuring device of a camera in accordance with one embodiment of the present invention.

FIG. 15 is a block diagram showing the entire construction of a distance measuring device of a camera in accordance with one embodiment of the present invention.

In FIG. 15, a microcomputer 101 is constructed by a central processing unit (CPU), a ROM for storing a program, a RAM capable of temporarily storing and reading data, etc. A driving circuit 102 is operated on the basis of control of this central processing unit (CPU).

The driving circuit 102 operates a diode 103 for emitting infrared rays. This diode 103 is called an LED in the following description. The infrared rays emitted from this LED 103 are converged by a light emitting lens 104 and are irradiated to a photographed object 105.

Pulse light reflected on this photographed object 105 is incident to a semiconductor optical position detector (PSD) 5 through a light receiving lens 106 and is focused and formed as an image by this lens 106. An automatic focusing (AF) signal processing circuit 107 is constructed by the first detecting circuit 9, the second detecting circuit 10 and the differential detecting circuit 11 shown in FIG. 13. Each of the PSD 5 and the AF signal processing circuit 107 has a structure similar to that shown in FIG. 13. Operations of the PSD 5 and the AF signal processing circuit 107 are also similar to those shown in FIG. 13. Accordingly, an explanation about the structures and the operations of the PSD 5 and the AF signal processing circuit 107 is omitted in the following description.

Photoelectric currents are outputted from both terminals of the PSD 5 to the first detecting circuit 9 and the second detecting circuit 10. An output of the differential detecting circuit 11 is inputted to the microcomputer 101.

This microcomputer 101 is disposed every one camera and writes and erases a correction constant per unit luminance of the photographed object 105 from a memory element 108. For example, the memory element 108 is constructed by E²PROM and can electrically perform erasing and writing operations of the correction constant, etc. every one camera.

When luminance of the photographed object 105 is measured, external light reflected on the photographed object 105 is received by a light receiving element 110 through a condenser lens 109. This light receiving element 110 converts a quantity of the received light to an electric signal and outputs this electric signal to a signal processing circuit 111.

The signal processing circuit 111 removes noise components from the electric signal and performs predetermined waveform processings, etc. The signal processing circuit 111 then outputs a processed signal to the microcomputer 101. When the microcomputer 101 receives this processed signal from the signal processing circuit 111, the microcomputer 101 calculates a correction constant for correcting an error in distance measuring data provided from the AF signal processing circuit 107 with respect to the external light. The microcomputer 101 then stores the calculated correction constant to the memory element 108. The microcomputer 101 also makes a calculation for correcting an error in distance measuring results of the AF signal processing circuit 107 caused by the external light by using this correction constant.

An operation of this distance measuring device of a camera will next be described.

First, the driving circuit 102 is operated by the microcomputer 101 to measure a distance between the photographed object 105 and the camera by the AF signal processing circuit 107. Thus, the LED 103 generates pulse light as infrared rays. This pulse light is irradiated to the photographed object 105 through the light emitting lens 104 and is then reflected on the photographed object 105.

The pulse light reflected on the photographed object 105 is focused and formed as an image on the PSD 5 through the light receiving lens 106. This PSD 5 receives a spot of the reflected light in a position located on a line corresponding to the distance of the photographed object 105. Accordingly, the distance of the photographed object 105 is calculated from the above formulas (1) and (2) in accordance with this position.

The relation between the distance of the photographed object and an electric current ratio $I_{L1}/I_{L2}$ of current outputs $I_{L1}$ and $I_{L2}$ of the PSD 5 is provided as shown in FIG. 6. As shown in FIG. 13, the current outputs $I_{L1}$ and $I_{L2}$ of the PSD 5 are inputted to the first detecting circuit 9 and the second detecting circuit 10 within the AF signal processing circuit 107. Thus, a distance measuring output Vo represented by the formula (13) is obtained at an output terminal of the differential detecting circuit 11. This distance measuring output Vo is outputted from the differential detecting circuit 11 to the microcomputer 101. An error in distance measuring data of the photographed object 105 is caused by external light.

Figure 16:
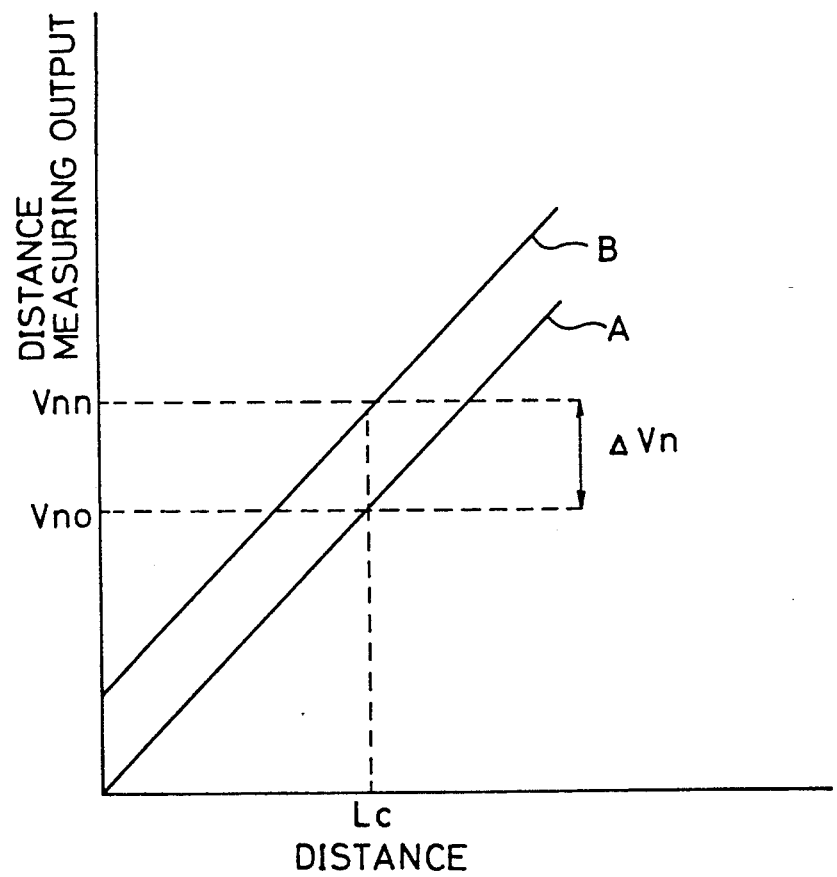
FIG. 16 is a graph showing the relation between a measured distance and a distance measuring output in each of cases in which there is external light and there is no external light in the distance measuring device of a camera shown in FIG. 15.

FIG. 16 shows the relation between the distance of the photographed object 105 and the distance measuring output. A characteristic line A shows output characteristics of the distance measuring device when there is no external light. A characteristic line B shows output characteristic of the distance measuring device when a photoelectric current In flows through the light receiving element 110 by the external light.

In measurement of the external light, the external light reflected on the photographed object 105 or external light around the photographed object 105 is received by the light receiving element 110 through the condenser lens 109. The light receiving element 110 converts the external light to an electric signal according to a quantity of the received light of this light receiving element 110. Thereafter, the light receiving element 110 outputs this electric signal to the signal processing circuit 111. The signal processing circuit 111 performs predetermined processing of an output of the light receiving element 110 and outputs a processed signal to the microcomputer 101.

The PSD 5 as a distance measuring sensor of the photographed object 105 basically has a spectral sensitivity in only an infrared region by an unillustrated visible light cutoff filter arranged on a front face of the PSD 5. However, in reality, the PSD 5 has a constant sensitivity with respect to visible light by a performance limit of the filter. Therefore, when the external light having a large intensity is incident to the PSD 5, an output of the light receiving element 110 for measuring brightness of the photographed object 105 is increased. Accordingly, the light receiving element 110 generates an output corresponding to that of the PSD 5. Therefore, it is possible to indirectly know large or small values of electric currents of the PSD 5 provided by the external light from the output of the light receiving element 110.

An arbitrary distance in a distance measuring range provided by the PSD 5 and the AF signal processing circuit 107 is adjusted and set as follows on the basis of the above explanation. This arbitrary distance is set to Lc in FIG. 16.

In this case, the photographed object 105 is first arranged in a position indicative of the arbitrary distance Lc. When there is no external light and a distance measurement is taken, the distance measuring device has an output provided on the characteristic line A shown in FIG. 16. Reference numeral Vno designates a distance measuring output provided from the AF signal processing circuit 107 when there is no external light.

Light is next irradiated to the photographed object by an unillustrated lamp, etc. such that the photographed object is set to have a constant luminance. At this time, an output of the light receiving element 110 shown in FIG. 15 is measured and a photoelectric current of this output is set to In.

Next, the distance measurement of the photographed object is again taken by the PSD 5 and the AF signal processing circuit 107. A distance measuring output of the AF signal processing circuit 107 provided by this distance measurement is set to Vnn. This distance measuring output Vnn and the above distance measuring output Vno are respectively outputted to the microcomputer 101. The microcomputer 101 calculates a difference between these distance measuring outputs as follows.

$$\Delta Vn = Vnn - Vno \tag{14}$$

A distance measuring output $\Delta Vn_1$ per unit luminance is provided as follows.

$$\Delta Vn_1 = \Delta Vn/In \tag{15}$$

This distance measuring output $\Delta Vn_1$ per unit luminance is written to the electrically erasable and writable memory element 108 by the microcomputer 101, thereby completing an adjusting process of the above distance.

Next, the distance measurement is really taken as follows when the photographed object 105 is photographed by using the camera.

At a time of the distance measurement, the distance measuring output $\Delta Vn_1$ per unit luminance is read from the electrically erasable and writable memory element 108 when a power source of the camera is turned on. At a time of the next photographing operation, an electric current provided by the external light is measured by the light receiving element 110 and is set to Ix. The distance measurement is further taken and a distance measuring output Vx is provided from the AF signal processing circuit 107.

The microcomputer 101 claculates distance measuring data V from the distance measuring output $\Delta Vn_1$ per unit luminance (as a correction constant), the electric current Ix provided by the external light, and the distance measuring output Vx in accordance with the following formula (16).

$$V = Vx - \Delta Vn_1 \cdot Ix \qquad (16)$$

The distance measuring data V represented by this formula (16) are set to accurate distance measuring data in which an error $\Delta Vn$ in distance measuring output Vno provided by the external light and shown in FIG. 16 is removed from the distance measuring output.

As mentioned above, in this embodiment, the intensity of external light is measured in advance by measuring luminance of the photographed object 105 using the light receiving element 110. An error in distance measuring results of the AF signal processing circuit 107 and the PSD 5 caused by the external light is corrected by measured results of the external light intensity. Accordingly, the distance measurement can be accurately taken without any influence of the external light intensity.

The present invention is not limited to the above embodiment, but can be changed in various kinds of modifications within a scope of the features of the invention.

For example, in the embodiment shown in FIG. 15, the light receiving element 110 and the signal processing circuit 111 are used as a means for measuring the external light. However, this external light measuring means may be commonly constructed by a photometric device of the camera.

Further, the electrically erasable and writable memory element 108 and the microcomputer 101 may be disposed within the distance measuring device every one camera. In this case, a correction constant for correcting an intrinsic error in distance measuring data caused by the external light is stored to the memory element 108 every one camera. An error in distance measuring data caused by optimum external light is thus corrected every camera.

As mentioned above, in accordance with a first structure of the present invention, the intensity of external light is measured in advance by an external light measuring means. An error in distance measuring results caused by the external light is corrected by using measured results of the external light intensity. Accordingly, it is possible to accurately take a distance measurement without any influence of the external light intensity. Therefore, it is possible to provide a distance measuring device of a camera for preventing an unfocused photograph from being taken in advance.

In accordance with a second structure of the present invention, the error in distance measuring results caused by the external light is corrected in accordance with the following correcting formula.

$$V = Vx - \Delta Vn_1 \cdot Ix$$

In this formula, reference numerals V, Vx, Ix, and $\Delta Vn_1$ respectively designate an output indicative of corrected distance measuring results, an output indicative of uncorrected distance measuring results, an output of the external light measuring means, and a correction constant. Accordingly, it is possible to provide a distance measuring device of a camera for rapidly and accurately correcting an error in distance measurement caused by the external light.

In accordance with a third structure of the present invention, the external light measuring means is commonly constructed by a photometric means of the camera. Accordingly, it is not necessary to newly dispose the external light measuring means within the camera. Therefore, it is possible to provide a distance measuring device of a camera in which the camera can be made compact and cost thereof can be reduced.

In accordance with a fourth structure of the present invention, a microcomputer and an electrically erasable and writable memory element are disposed every one camera. A suitable correction constant for correcting an error in distance measuring results caused by external light is stored to this memory element every one camera. The distance measuring results are corrected by measured results of the external light and the correction constant. Accordingly, it is possible to correct an error in distance measurement caused by optimum external light every camera. Therefore, it is possible to provide a distance measuring device of the camera for taking the distance measurement more accurately.

Many widely different embodiments of the present invention may be constructed without departing from the spirit and scope of the present invention. It should be understood that the present invention is not limited to the specific embodiments described in the specification, except as defined in the appended claims.

What is claimed is:

1. A distance measuring device of a camera comprising:

a light source for emitting pulse light to a measured object;

a semiconductor optical position detector disposed in a position in which a spot of the pulse light reflected on said measured object is focused and formed as an image;

the semiconductor optical position detector continuously detecting the position of an incident light spot according to a distance of said measured object based on a parallax between said light source and the semiconductor optical position detector in a displacing direction of the spot position provided by a change in said distance;

the semiconductor optical position detector providing first and second electric current outputs having a mutual electric current ratio according to the detected position of the incident light spot;

a first detecting circuit for receiving said first electric current output of the semiconductor optical position detector, and logarithmically transforming and outputting a changing amount of said first electric current output provided by said pulse light;

a second detecting circuit for receiving said second electric current output of the semiconductor optical position detector, and logarithmically transforming and outputting a changing amount of said second electric current output provided by said pulse light;

a differential detecting circuit for providing a distance measuring signal by calculating a difference between said changing amounts of the first and second electric current outputs logarithmically transformed and outputted from the first and second detecting circuits;

external light measuring means for measuring the luminance of a photographed object; and means for correcting an error in said distance measuring signal of the differential detecting circuit caused by external light by using an intensity of the external light measured in advance by the external light measuring means.

2. A distance measuring device of a camera as claimed in claim 1, wherein said correcting means corrects said error in said distance measuring signal of the differential detecting circuit caused by the external light in accordance with the following formula, $$V = Vx - \Delta Vn_1 \cdot Ix$$

where reference numerals V, Vx, Ix, and $\Delta Vn_1$ respectively designate an output indicative of corrected distance measuring results, an output indicative of uncorrected distance measuring results, an output of the external light measuring means, and a correction constant.

3. A distance measuring device of a camera as claimed in claim 1, wherein said external light measuring means is constructed by a photometric device of the camera.

4. A distance measuring device of a camera comprising:

a light source for emitting pulse light to a measured object;

a semiconductor optical position detector disposed in a position in which a spot of the pulse light reflected on said measured object is focused and formed as an image;

the semiconductor optical position detector continuously detecting the position of an incident light spot according to a distance of said measured object based on a parallax between said light source and the semiconductor optical position detector in a displacing direction of the spot position provided by a change in said distance;

the semiconductor optical position detector providing first and second electric current outputs having a mutual electric current ratio according to the detected position of the incident light spot;

a first detecting circuit for receiving said first electric current output of the semiconductor optical position detector, and logarithmically transforming and outputting a changing amount of said first electric current output provided by said pulse light;

a second detecting circuit for receiving said second electric current output of the semiconductor optical position detector, and logarithmically transforming and outputting a changing amount of said second electric current output provided by said pulse light;

a differential detecting circuit for providing a distance measuring signal by calculating a difference between said changing amounts of the first and second electric current outputs logarithmically transformed and outputted from the first and second detecting circuits;

external light measuring means for measuring the luminance of a photographed object;

a microcomputer disposed in the camera;

an electrically erasable and writable memory element for writing a correction constant thereto with respect to external light every one camera by the microcomputer; and means for correcting an error in said distance measuring signal of the differential detecting circuit caused by the external light;

the correcting means making a calculation for correcting this error by an intensity of the external light measured by said external light measuring means and the correction constant stored to said memory element such that a distance measurement is optimally taken every camera.

5. A distance measuring device of a camera comprising:

a light source for emitting pulse light to a measured object;

a semiconductor optical position detector disposed in a position in which a spot of the pulse light reflected on said measured object is focused and formed as an image;

the semiconductor optical position detector continuously detecting the position of an incident light spot according to a distance of said measured object based on a parallax between said light source and the semiconductor optical position detector in a displacing direction of the spot position provided by a change in said distance;

the semiconductor optical position detector providing first and second electric current outputs having a mutual electric current ratio according to the detected position of the incident light spot;

a first detecting circuit for receiving said first electric current output of the semiconductor optical position detector, and logarithmically transforming and outputting a changing amount of said first electric current output provided by said pulse light;

a second detecting circuit for receiving said second electric current output of the semiconductor optical position detector, and logarithmically transforming and outputting a changing amount of said second electric current output provided by said pulse light;

a differential detecting circuit for providing a distance measuring signal by calculating a difference between said changing amounts of the first and second electric current outputs logarithmically transformed and outputted from the first and second detecting circuits;

external light measuring means for measuring the luminance of a photographed object;

an electrically erasable and writable memory element for writing a correction constant thereto with respect to external light every one camera; and means for correcting an error in said distance measuring signal of the differential detecting circuit caused by the external light;

the correcting means making a calculation for correcting this error by an intensity of the external light measured by said external light measuring means and the correction constant stored to said memory element such that a distance measurement is optimally taken every camera.

6. A distance measuring device of a camera as claimed in claim 5, wherein the distance measuring device further comprises a microcomputer disposed in the camera.

* * * * *